Sept. 8, 1964 M. MACK 3,148,275
SPECIMEN HOLDER FOR X-RAY POWDER ANALYSIS
Filed Feb. 8, 1962
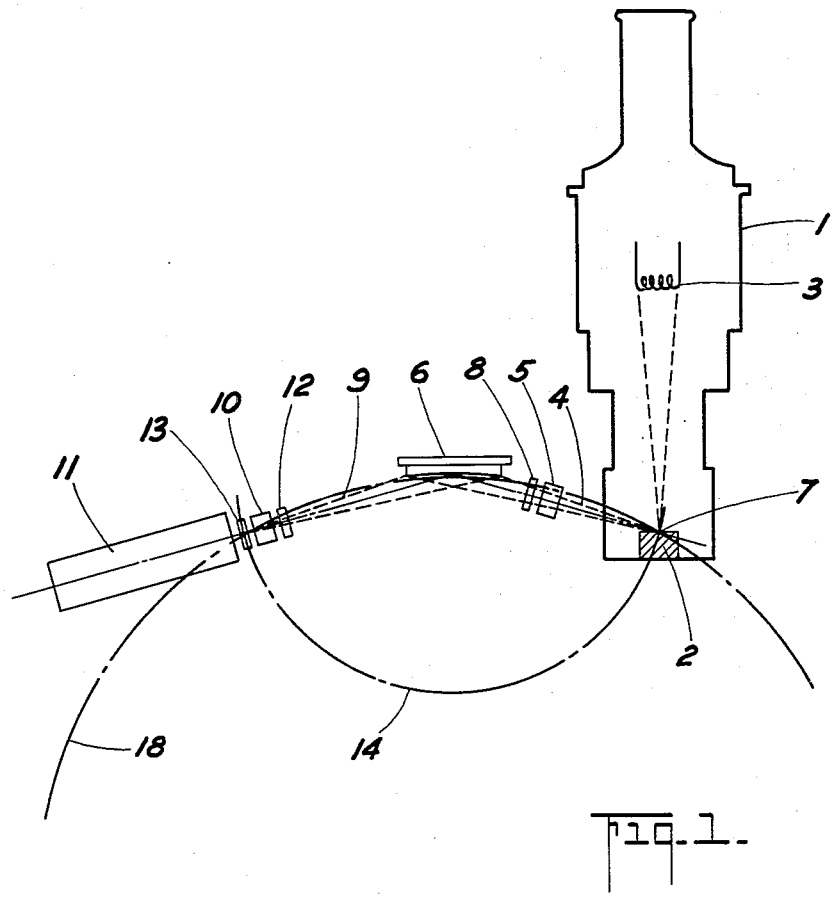
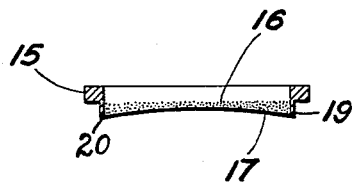
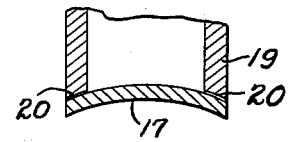
INVENTOR.
MARIAN MACK
BY
AGENT.

Patent text

3,148,275
SPECIMEN HOLDER FOR X-RAY POWDER ANALYSIS
Marian Mack, Hastings on Hudson, N.Y., assignor to North American Philips Company, Inc., New York, N.Y., a corporation of Delaware
Filed Feb. 8, 1962, Ser. No. 172,011
6 Claims. (Cl. 250—51.5)

My invention relates to a specimen holder for X-ray analysis.

The invention described herein was made in the performance of work under a NASA contract and is subject to the provisions of the National Aeronautics and Space Act of 1958, Public Law 85–568 (72 Stat. 426; 42 U.S.C. 2451), as amended.

In an X-ray instrument for analyzing a specimen, such as an X-ray diffractometer, the specimen is supported in the path of a beam of X-rays which are reflected at angles $\theta$ determined by the spacing $d$ between planes of a crystal in accordance with Braggs' law which states:

$$n\lambda = 2d \sin \theta$$

where $n$ is the order of reflection and $\lambda$, the wave-length of the incident X-rays. If a monochromatic beam of X-rays of known wavelength $\lambda$ is incident upon the crystal, the angle $\theta$ at which these incident X-rays are reflected can be employed to measure the spacing $d$ between the crystal planes. The use of interplanar spacings ($d$'s) for identification purposes is well-known (see, for example, Index to the X-ray Powder Data File, Am. Soc. Test. Mat., Spec. Tech. Pub. 48–F, Philadelphia (1957)).

The reflected X-rays can be detected either by a film, positioned to intercept the reflected X-rays, or by a detecting device arranged to rotate about the specimen. In the latter case, the detector is mounted on a calibrated arc, referred to as a goniometer, and is rotated about the axis of rotation of the specimen at twice the angular speed of rotation of the specimen.

Ideally the specimen surface should be curved to fit the focussing circle whose radius is:

$$r = R/(2 \sin \theta)$$

where $R$ is the goniometer radius. Thus, during scanning the specimen curvature should be continually varied to fit the focussing circle at all values of the angle $\theta$. This is difficult to accomplish, and in practice a flat specimen is normally used, which causes an asymmetric broadening of the line profile and a shift of its peak and centroid. (See Parrish, W. and Wilson, A. J. C., "Precision Measurement of Lattice Parameters of Polycrystalline Specimens," International Tables for X-ray Crystallography, 2, 216–234, Kynoch Press, Birmingham, England, 1960.)

In order to obtain good line profiles, it is necessary to limit the divergence of the X-ray beam in the focussing plane, i.e., the plane normal to the goniometer axis of rotation. This results in reduced intensity of the X-ray beam. The use of a curved specimen, however, permits the use of an X-ray beam having a larger divergence angle $\alpha$ which is desirable because the intensity of the beam is increased and, therefore, the statistical accuracy is improved approximately proportional to the square root of the intensity. Therefore, the accuracy of the intensity measurement may be increased, or the time required for the measurement decreased.

In accordance with my invention, it has been found that by giving the specimen a fixed curvature with a radius fitting the focussing circle for an angle $\theta$ in the angular range of interest, a larger angular aperture may be used. With a specimen of radius of curvature, $r$, the focussing in the focussing plane is exact for a particular $2\theta$, and is improved for all the $2\theta$'s measured. The degree of improvement at any given $2\theta$ angle is a function of the $2\theta$ angle, the angular divergence $\alpha$, and the ratio of the ideal radius at that angle to the actual radius. Since asymmetric broadening increases with decreasing $2\theta$, the degree of improvement is greater at lower $2\theta$ angles. Since the ideal radius decreases with increasing $2\theta$, a particular radius which satisfies the correct focussing conditions for a specific angle would be a better approximation to the ideal than a flat specimen for all larger $2\theta$ angles.

To facilitate preparation of a curved specimen, I have devised a specimen holder which is adapted to be loaded from the rear, i.e. the side remote from the incident X-ray beam.

The invention will be described with reference to the accompanying drawing in which:

FIG. 1 is a plan view of an instrument employing the specimen holder according to the invention; and FIG. 2 is a sectional view of the specimen holder.

FIG. 3 shows the banking surface of the holder.

Referring to the drawing, the source of X-rays is an X-ray tube 1 having a target 2. Electrons emitted by a cathode 3 strike target 2 generating X-rays (shown by broken lines 4) which are collimated by Soller slits 5 to limit vertical divergence of the beam in a plane normal to the specimen. The Soller slits are parallel metal partitions arranged parallel to the plane of the drawing.

A specimen of material to be analyzed is placed in the specimen holder 6 which is mounted so that the surface of the X-ray beam views the target 2 at a low angle, i.e. less than about 10°. X-rays, generated by electrons 7 incident on the target, appear as a line source when the target is viewed at low glancing angles. The Soller slits 5 effectively break up the line source into a plurality of point sources of X-ray radiation. Divergence of the beam is limited by divergence slit 8.

After striking the specimen, the X-ray beam is diffracted by the crystal planes within the specimen. The diffracted beam of X-rays 9, is limited by Soller slits 10, and enters detector 11 through receiving slit 13. An anti-scatter slit 12 is placed before the Soller slits. The detector 11 and receiving slit 13 are mounted for rotation about goniometer circle 14 at twice the angular speed of rotation of specimen holder 6.

The instrument just described forms no part of my invention. The specimen holder, about to be described, and used in the instrument described may be employed with other types of X-ray apparatus where a curved specimen is desired.

The specimen holder is of special design to facilitate loading of a powder specimen for X-ray analysis. The holder comprises a flat portion 15 used as a banking surface and a tubular portion 19 with the front surface 20 (see FIG. 3) machined to the desired curvature. The banking surface of the holder must coincide with the curved section along the specimen axis of rotation. A thin beryllium foil 17, for example 0.05 mm. in thickness, is cemented to the front surface of the tubular section, and serves as a guide surface for the powdered specimen 16 which is introduced and dropped onto the foil through the opening in the rear of the base. The foil thus serves to give the powder the required curvature.

The beryllium foil 17 absorbs only a small portion of the X-ray beam; it also acts as a calibration standard. Because of the strong preferred orientation of rolled beryllium foil, the only intense reflection is the 00:2 reflection, which occurs at 52° ($2\theta$) with CuK$\alpha$ radiation. The foil thus acts as a two-dimensional single crystal. Since the lower surface of the foil lies inside the focussing circle, the Be reflection is displaced by an angular amount which can be calculated. (See Parrish, W. and Wilson, A. J. C., loc. cite.) The upper surface of the foil is in contact with the powder specimen and lies on the focussing circle.

The curved specimen holder may be mounted on the goniometer circle, in which case the focussing circle and the goniometer circle will coincide over the entire angular range and a single radius of curvature will suffice, as for example, in the Seeman-Bohlen geometry. (For a description of this geometry, see: H. Seeman, Ann. Physik, 59, 455 (1919) and H. Bohlen, Ann. Physik 61, 421 (1920)). Insuring proper curvature of the specimen is also facilitated in this case.

While I have described my invention in connection with specific examples, other modifications thereof will be apparent to those skilled in this art without departing from the spirit and scope of the invention which is defined in the appended claims.

What I claim is:

1. In an X-ray apparatus including a source of X-rays and a detector positioned on a goniometer circle, a specimen of powdered material having a curved surface positioned on the goniometer circle to focus X-rays diffracted by the specimen at the detector, said specimen being contained within a holder comprising a tubular member having a curved end surface portion at one end thereof, a wall pervious to and in the path of X-rays from said source attached to said curved end surface portion for supporting said specimen, said curved end surface portion and said wall having a curvature corresponding to the radius of a focussing circle which intercepts the detector whereby the specimen is curved to focus diffracted X-rays at said detector.

2. In an X-ray apparatus including a source of X-rays and a detector positioned on a goniometer circle, a specimen of powdered material having a curved surface positioned on the goniometer circle to focus X-rays diffracted by the specimen at the detector, said specimen being contained within a holder comprising a tubular member having a curved end surface portion of one end thereof, a wall pervious to and in the path of X-rays from said source attached to said curved end surface portion for supporting said specimen, said curved end surface portion and said wall having a radius of curvature $r = R/(2 \sin \theta)$ where R is the radius of the goniometer circle and $\theta$ the angle of reflection of X-rays incident upon the specimen whereby said specimen is curved and focusses diffracted X-rays at said detector.

3. In an X-ray apparatus including a source of X-rays and a detector positioned on a goniometer circle, a specimen of powdered material having a curved surface positioned on the goniometer circle to focus X-rays diffracted by the specimen at the detector, said specimen being contained within a holder comprising a tubular member having a curved end surface portion at one end thereof, a thin beryllium wall pervious to and in the path of X-rays from said source attached to said curved end surface for supporting said specimen, said curved end surface and said wall having a radius of curvature $r = R/(2 \sin \theta)$ where R is the radius of the goniometer circle and $\theta$ the angle of reflection of X-rays incident upon the specimen whereby said specimen is curved and focusses diffracted X-rays at said detector.

4. In an X-ray apparatus including a source of X-rays and a detector positioned on a goniometer circle, a specimen of powdered material having a curved surface positioned on the goniometer circle to focus X-rays diffracted by the specimen at the detector, said specimen being contained within a holder comprising a tubular member having a curved end surface portion at one end thereof, a thin beryllium wall pervious to and in the path of X-rays from said source attached to said curved end surface for supporting said specimen, said curved end surface and said wall having a radius of curvature $r = R/(2 \sin \theta)$ where R is the radius of the goniometer circle and $2\theta$ has a value of about 20° to 30° whereby said specimen is curved and focusses diffracted X-rays at said detector.

5. In an X-ray apparatus including a source of X-rays and a detector positioned on a goniometer circle, a specimen of powdered material having a curved surface positioned on the goniometer circle to focus X-rays diffracted by the specimen at the detector, said specimen being contained within a holder comprising a tubular member having a curved end surface portion at one end thereof a beryllium wall having a thickness of about 0.05 mm. in the path of X-rays from said source attached to said curved end surface for supporting said specimen, said curved end surface portion and said wall having a radius of curvature of about 16.42 cm. corresponding to a goniometer circle having a radius of about 8.5 cm. whereby said specimen is curved and focusses diffracted X-rays at said detector.

6. In an X-ray apparatus including a source of X-rays and a detector positioned on a goniometer circle, a specimen of powdered material having a curved surface positioned on the goniometer circle to focus X-rays diffracted by the specimen at the detector, said specimen being contained within a holder comprising a tubular member having a curved end surface portion at one end thereof, a beryllium wall having a thickness of about 0.05 mm. in the path of X-rays from said source attached to said curved end surface for supporting said specimen, said curved end surface portion and said wall having a radius of curvature $r = R/(2 \sin \theta)$, where R is the radius of the goniometer circle and $2\theta$ is about 20° to 30° whereby said specimen is curved and focusses diffracted X-rays at said detector.

References Cited in the file of this patent

UNITED STATES PATENTS

| | | |
|---|---|---|
| 2,317,329 | McLachlan | Apr. 20, 1943 |
| 2,512,575 | Champaygne | June 20, 1950 |
| 3,027,456 | Tabikh | Mar. 27, 1962 |

OTHER REFERENCES

Uses of Low Voltage X-Ray Tubes With Thin Beryllium Windows in Non-Destructive Testing, by T. H. Rogers, Cathode Press, 1953, vol. 10, No. 2, pages 16 to 20 and 28 to 30.

X-Ray Diffraction Procedures, by Klug & Alexander, 1954, John Wiley & Sons, New York, QC 482,K5,C.2, chaper 5.